US011158025B2

(12) United States Patent
Stimm et al.

(10) Patent No.: US 11,158,025 B2
(45) Date of Patent: Oct. 26, 2021

(54) METHODS AND APPARATUS FOR OPTIMIZED STITCHING OF OVERCAPTURE CONTENT

(71) Applicant: GoPro, Inc., San Mateo, CA (US)

(72) Inventors: Daryl Stimm, Encinitas, CA (US); David Newman, San Diego, CA (US); Kyler William Schwartz, Valley Center, CA (US); William Edward MacDonald, San Diego, CA (US)

(73) Assignee: GoPro, Inc., San Mateo, CA (US)

( * ) Notice: Subject to any disclaimer, the term of this patent is extended or adjusted under 35 U.S.C. 154(b) by 297 days.

(21) Appl. No.: 16/237,089

(22) Filed: Dec. 31, 2018

(65) Prior Publication Data

US 2021/0082085 A1    Mar. 18, 2021

(51) Int. Cl.
| | |
|---|---|
| *G06T 3/40* | (2006.01) |
| *G06T 7/13* | (2017.01) |
| *G06T 3/00* | (2006.01) |
| *H04N 5/232* | (2006.01) |
| *H04N 7/08* | (2006.01) |

(52) U.S. Cl.
CPC .......... *G06T 3/4038* (2013.01); *G06T 3/0062* (2013.01); *G06T 3/0093* (2013.01); *G06T 7/13* (2017.01); *H04N 5/23238* (2013.01); *H04N 7/08* (2013.01)

(58) Field of Classification Search
CPC .................................................... G06T 3/4038
USPC .......................................................... 348/36
See application file for complete search history.

(56) References Cited

U.S. PATENT DOCUMENTS

| | | | |
|---|---|---|---|
| 8,294,748 B2 | 10/2012 | Stec | |
| 10,063,792 B1* | 8/2018 | Brailovskiy | ......... H04N 5/2258 |
| 2018/0075635 A1 | 3/2018 | Choi | |
| 2019/0082103 A1* | 3/2019 | Banerjee | ............... G06T 3/4038 |

OTHER PUBLICATIONS

Kim Hansung et al, "3D Scene Reconstruction from Multiple Spherical Stereo Pairs", International Journal of Computer Vision, Kluwer Academic Publishers, Norvvell, US, (Mar. 3, 2013), vol. 104, No. 1, pp. 94-116, XP035362202.
International Search Report and Written Opinion issued in PCT/US2019/68991, dated Mar. 23, 2020, 11 pages.

* cited by examiner

*Primary Examiner* — Daniel T Tekle
(74) *Attorney, Agent, or Firm* — Wang Hardoon, P.C.

(57) ABSTRACT

Apparatus and methods for optimized stitching of overcapture content. In one embodiment, the optimized stitching of the overcapture content includes capturing the overcapture content; producing overlap bands associated with the captured overcapture content; downsampling the produced overlap bands; generating derivative images from the downsampled overlap bands; generating a cost map associated with the generated derivative images; determining shortest path information for the generated cost map; generating a warp file based on the determined shortest path information, the generated warp file being utilized for the optimized stitching of the overcapture content. Camera apparatus and a non-transitory computer-readable apparatus are also disclosed.

20 Claims, 13 Drawing Sheets

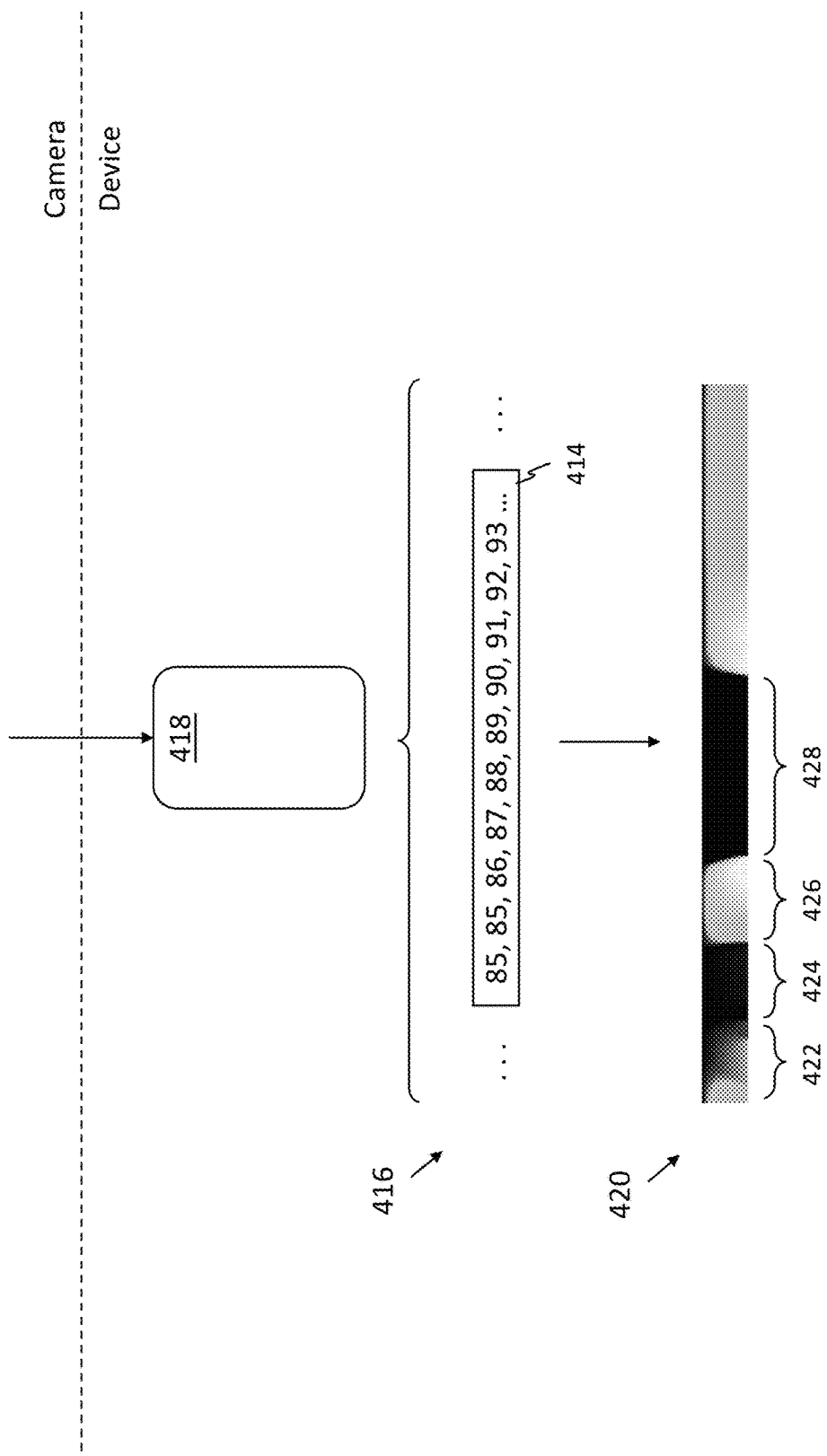

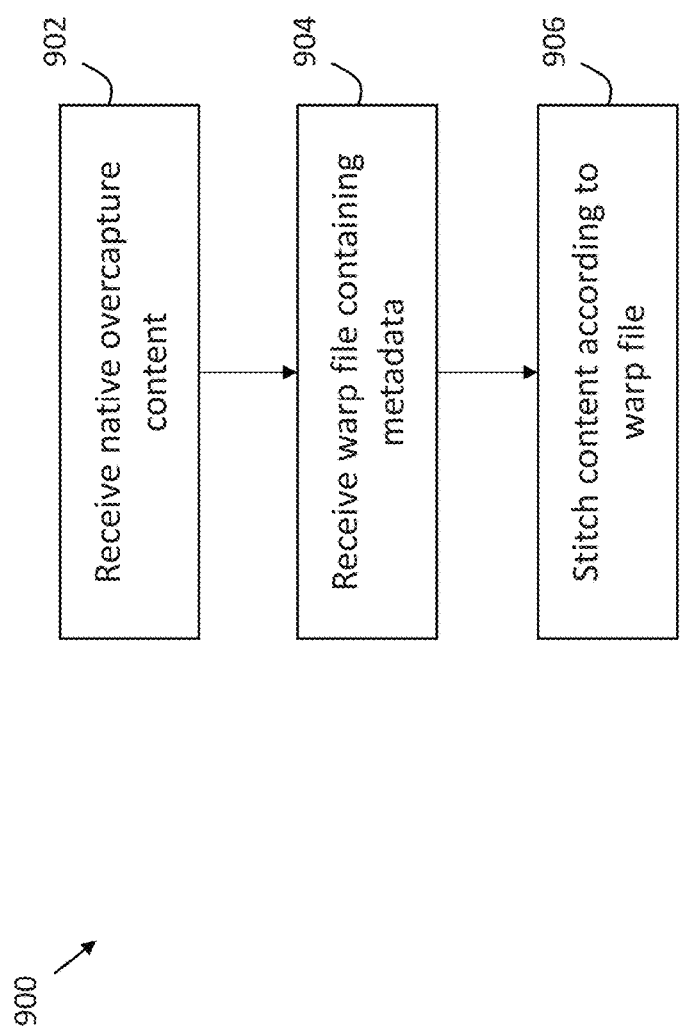

US 11,158,025 B2

METHODS AND APPARATUS FOR OPTIMIZED STITCHING OF OVERCAPTURE CONTENT

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE DISCLOSURE

Field of the Disclosure

The present disclosure relates generally to processing and/or presenting of image data and/or video content, and more particularly in one exemplary aspect to providing an optimized stitch to overcapture (e.g., 360°) content.

Description of Related Art

In image and video capturing systems, stitching of panoramic content captured by two or more image capture devices may be prone to slice-overlap artifacts that cause distortions where the portions meet or overlap in the resulting images or videos. This type of distortion may be present in imaging applications in which two or more images are "stitched" in order to generate panoramic or wide-angle captured content. The areas where the portions are stitched together often show as being misaligned, blurry, and/or incomplete. Moreover, generating these stitched images often requires a significant amount of processing resources to complete. Hence, the user experience for typical stitching of image or video content has room for significant improvement.

Overcaptured content may be formed from two images captured by, for example, a camera system with two or more fisheye lenses. In the context of a camera system with two fisheye lenses, each image may extend beyond 180° per camera lens (e.g., 194°), resulting in hemispheric imaging content. Superimposing or overlapping the two parts of hemispheric imaging content (each of which extends beyond 180°) will result in parallax, as shown in FIG. 1. Parallax is a displacement or difference in the apparent position of an object viewed along two different lines of sight. Parallax may be resolved via stitching algorithms.

One issue that arises with stitching on modern hardware (e.g., camera system, desktop workstation) is that it requires a high amount of computational resources and/or power between a CPU and a discrete GPU. For example, the GPU may process a pair of images, and send it to the CPU so that it may apply stitching algorithms to the pair of images where there is overlap. To do this, a large amount of image data (e.g., each processed frame) must be transferred between the discrete GPU memory and the CPU memory. In modern systems that utilize different pools of memory resources for the GPU and the CPU, this incurs additional processing time and resources.

Another issue arises with consumption or viewing of images or videos as they are being captured in the moment, i.e., not after processing. As mentioned above, stitching requires a significant amount of time to complete. This lag is even more pronounced in high- and ultra-high-resolution images and video. In usage scenarios where capturing action shots or "Kodak moments" in sports, outdoor activities, and the like (such as the type captured and handled by camera systems developed by the Assignee hereof), a smooth "real time" viewing experience is desired. However, typical camera systems will require significant processing time before being able to view dense content such as overcapture content. To these ends, solutions are needed to improve overcapture camera systems in terms of their stitching mechanisms so as to reduce or eliminate artifacts at overlap boundaries, and to improve post-processing time for a smoother end-user experience.

SUMMARY

The present disclosure satisfies the foregoing needs by providing, inter alia, methods and apparatus for optimized stitching of, for example, overcaptured imaging content.

In one aspect, a method for optimized stitching of overcapture content is disclosed. In one embodiment, the method includes: capturing the overcapture content; producing overlap bands associated with the captured overcapture content; downsampling the produced overlap bands; generating derivative images from the downsampled overlap bands; generating a cost map associated with the generated derivative images; determining shortest path information for the generated cost map; generating a warp file based on the determined shortest path information, the generated warp file being utilized for the optimized stitching of the overcapture content.

In one variant, the method further includes generating a plurality of fisheye images from the captured overcapture content.

In another variant, the method further includes projecting the produced overlap bands into an equirectangular projection.

In yet another variant, the method further includes transmitting the generated warp file and the generated plurality of fisheye images to another device.

In yet another variant, the method further includes stitching the plurality of fisheye images from the captured overcapture content and transmitting the stitched fisheye images and the generated warp file to another device.

In yet another variant, the transmitting of the generated warp file to the another device enables re-stitching of the stitched fisheye images.

In yet another variant, the generating of the warp file includes generating a plurality of integer values, the generated plurality of integer values being associated with displacement values associated with a stitch line for the captured overcapture content.

In another aspect, a camera apparatus is disclosed. In one embodiment, the camera apparatus includes two or more image capture devices; a network interface in data communication with the two or more image capture devices; and an image processing pipeline that is configured to: receive captured content from the two or more image capture devices; perform edge detection on the received captured content; and generate a warp track file associated with the received captured content the generated warp track file being utilized for stitching of the received captured content.

In one variant, the generation of the warp track file by the image processing pipeline includes: production of overlap bands associated with the received captured content; downsample of the produced overlap bands; generation of derivative images from the downsampled overlap bands; generation of a cost map associated with the generated derivative images; and determination of shortest path information for the generated cost map.

In another variant, the generated warp track file and the captured content from the two or more image capture devices are transmitted via the network interface to another device.

In yet another variant, the transmission of the generated warp track file and the transmission of the captured content to the another device enables re-stitching of the captured content.

In yet another variant, the generation of the warp file includes generation of a plurality of integer values, the generated plurality of integer values being associated with displacement values associated with a stitch line for the captured content.

In yet another variant, the receipt of the captured content includes receipt of fisheye projections.

In yet another variant, the image processing pipeline is further configured to stitch the fisheye projections and the camera apparatus is configured to transmit the stitched fisheye projections and the generated warp file to another device via the network interface.

In yet another variant, the transmission of the generated warp track file and the transmission of the stitched fisheye projections to the another device enables a re-stitch of the stitched fisheye projections.

In yet another aspect, a non-transitory computer-readable apparatus is disclosed. In one embodiment, the non-transitory computer-readable apparatus includes a storage medium having a computer program stored thereon, the computer program including a plurality of instructions configured to, when executed by a processor apparatus, cause an apparatus to: receive captured content from two or more image capture devices; perform edge detection on the received captured content; and generate a warp file associated with the received captured content, the generated warp file being utilized for stitching of the received captured content.

In one variant, the receipt of the captured content includes receipt of fisheye projections.

In another variant, the plurality of instructions, when executed by the processor apparatus, are further configured to stitch the fisheye projections and transmit the stitched fisheye projections and the generated warp file to another device via a network interface.

In yet another variant, the transmission of the generated warp file and the transmission of the stitched fisheye projections to the another device enables a re-stitch of the stitched fisheye projections.

In yet another variant, the generation of the warp file includes: production of overlap bands associated with the received captured content; downsample of the produced overlap bands; generation of derivative images from the downsampled overlap bands; generation of a cost map associated with the generated derivative images; and determination of shortest path information for the generated cost map.

In yet another aspect, a computing device is disclosed. In one embodiment, the computing device is configured to receive overcapture content; receive a warp file containing metadata associated with the received overcapture content; and stitch the received overcapture content in accordance with the received warp file.

Other features and advantages of the present disclosure will immediately be recognized by persons of ordinary skill in the art with reference to the attached drawings and detailed description of exemplary embodiments as given below.

BRIEF DESCRIPTION OF THE DRAWINGS

FIGS. 4A-4D illustrate an exemplary embodiment of a pipeline in which a warp file is generated for enabling optimized stitching of overcapture content, in accordance with the principles of the present disclosure.

FIG. 9 is a logical flow diagram illustrating one exemplary method for the stitching of content according to a warp track file, in accordance with the principles of the present disclosure.

All figures disclosed herein are © Copyright 2018 GoPro Inc. All rights reserved.

DETAILED DESCRIPTION

Implementations of the present technology will now be described in detail with reference to the drawings, which are provided as illustrative examples and species of broader genus' so as to enable those skilled in the art to practice the technology. Notably, the figures and examples below are not meant to limit the scope of the present disclosure to any single implementation or implementations, but other implementations are possible by way of interchange of, substitution of, or combination with some or all of the described or illustrated elements. Wherever convenient, the same reference numbers will be used throughout the drawings to refer to same or like parts.

"In-Camera" Stitch—

Figure 2:
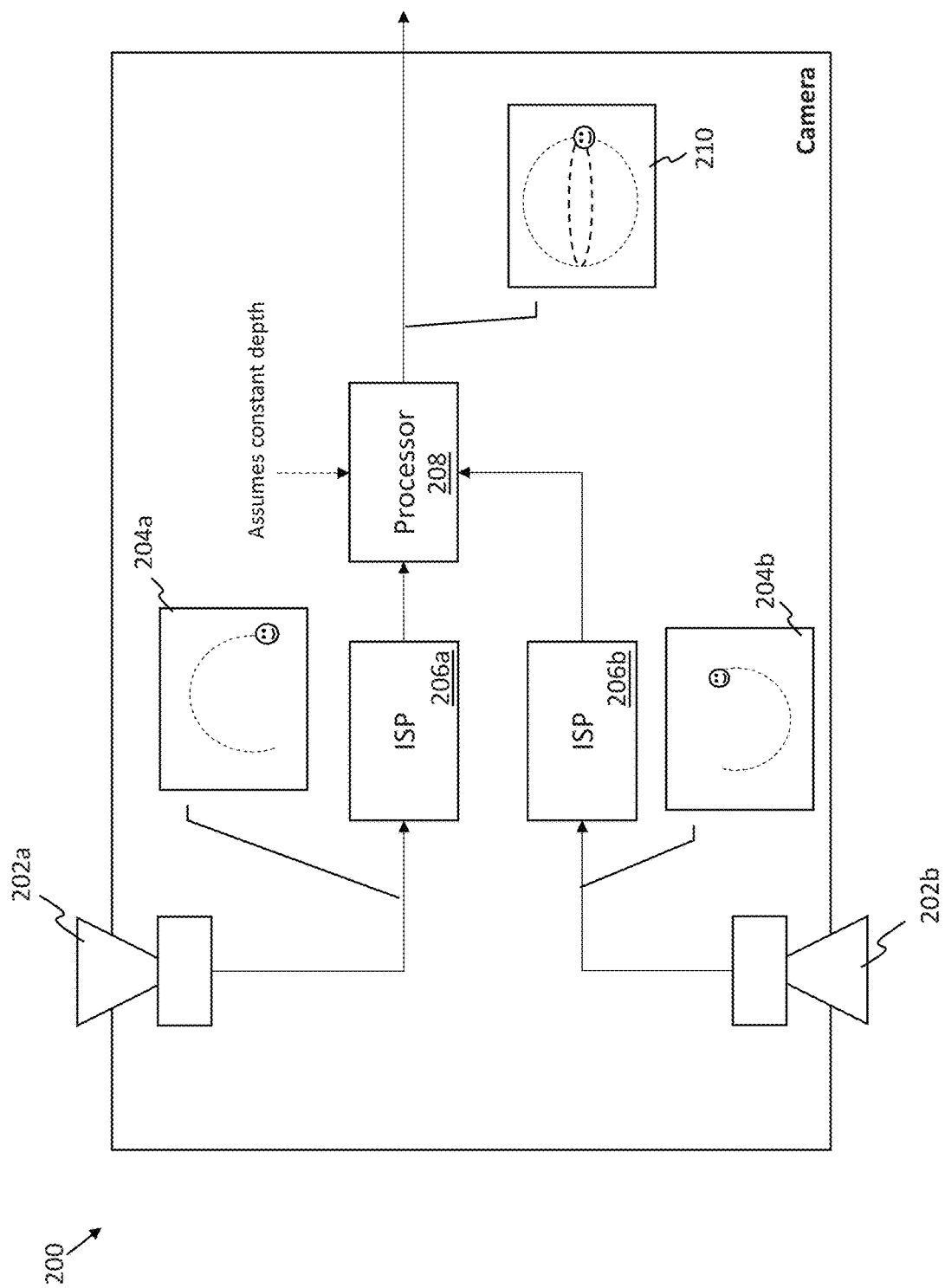
FIG. 2 is a block diagram of one exemplary spherical camera system that performs in-camera stitching, in accordance with the principles of the present disclosure.

FIG. 2 illustrates a block diagram of a camera system 200 for delivering stitched panoramic content to an end user for consumption (e.g., for viewing on a display device). In one embodiment, two (or more) capture devices (e.g., fisheye cameras) 202a, 202b of a camera system 200 may capture respective hyper-hemispheric fisheye images and/or video content 204a, 204b. In one implementation, these capture devices may be oriented substantially back-to-back so as to capture opposite sides of the camera system 200. Each of the natively captured imaging content 204a, 204b may be fed to, for example, a respective image signal processor (ISP) 206a, 206b that is in data communication with the image sensors 202a, 202b. The ISPs 206a, 206b may generate an image file in the same file format. Such image file formats may include, but are not limited to, JPEG/JPG, PNG, BMP, TIFF/TIF, and GIF. The ISPs 206a, 206b may generate video file(s) that are in one of various formats including MP4, MPEG, AVI, or MOV formats. Yet other known file types may be used as would be readily appreciated by one of ordinary skill given the contents of the present disclosure.

A capture device 200 and an ISP 206 may be in wired or wireless data communication (e.g., via data links) with a network interface. Examples of wireless interface configuration include wireless communications link using WLAN (e.g., Wi-Fi or other IEEE Std. 802.11-based protocol), Bluetooth (BT) or Bluetooth Low Energy (BTLE), cellular data link (e.g., 3GPP-based 3G, 4G, 5G, 4.5G, 4G/5G protocols), ZigBee, Near Field Communications (NFC) link, for example, using ISO/IEC 14443 protocol, IEEE Std. 802.15, 6LowPAN, Z-Wave, ANT+ link, and/or other communication links. Wired communications may include, for example, HDMI, USB, digital video interface, DisplayPort interface (e.g., digital display interface developed by the Video Electronics Standards Association (VESA), Ethernet, Thunderbolt), and/or other wired communication links.

In some variants, a given ISP 206 may be configured to generate images that may be used by encoders, processors, other hardware accelerators, and/or other logic resident on the camera system 200 to render an image (as opposed to, e.g., native fisheye images captured by the image capture devices 202a, 202b that retain full fisheye information density). In some variants, the received imaging content may be fed into an image splitter to split the captured imaging content into two or more portions, as described in co-owned and co-pending U.S. patent application Ser. No. 15/982,945 entitled "METHODS AND APPARATUS FOR MULTI-ENCODER PROCESSING OF HIGH RESOLUTION CONTENT" and filed May 17, 2018, and co-owned and co-pending U.S. patent application Ser. No. 16/234,396 entitled "METHODS AND APPARATUS FOR MULTI-ENCODER PROCESSING OF HIGH RESOLUTION CONTENT" and filed Dec. 27, 2018, each of the foregoing being incorporated herein by reference in its entirety.

Referring back to the "in-camera" stitching performed by the camera system 200 as shown in FIG. 2, the ISPs 206a, 206b may each transmit the generated images to a processor apparatus 208. The processor apparatus 208 may stitch each of the generated images (or video frames) into, for example, a 360° image having the same file format as those generated at the ISPs (e.g., JPEG). In some variants, the resultant image may be in a different format that may be more appropriate for consumption by a user device.

To achieve the stitching, the processor 208 may perform pattern matching. One type of pattern matching includes finding a corresponding pixel for each pixel of one image by the processor apparatus. However, this may introduce issues in which the pixels of the generated image file may be distorted or depreciated as compared to the originally captured pixels. For example, at least some pixels of a resulting JPEG image may have been interpolated or extrapolated during conversion to JPEG. Hence, pattern matching may become burdensome in terms of, e.g., processor, power, and/or memory resources. Camera systems typically do not have a stable source of power or high processing power. Hence, implementing the "in-camera" stitch may be computationally expensive.

The stitched image 210 may be provided to another device, such as a mobile user device (e.g., smartphone, laptop, tablet, smartwatch, Internet of Things (IOT) device), a server apparatus (e.g., for later retrieval or access by yet another device), a local storage device (e.g., for later retrieval or access by the camera system 200), a workstation (e.g., for further image or video processing), or another camera system. Such provision may be performed via wired or wireless means (e.g., via the Internet).

Figure 1:
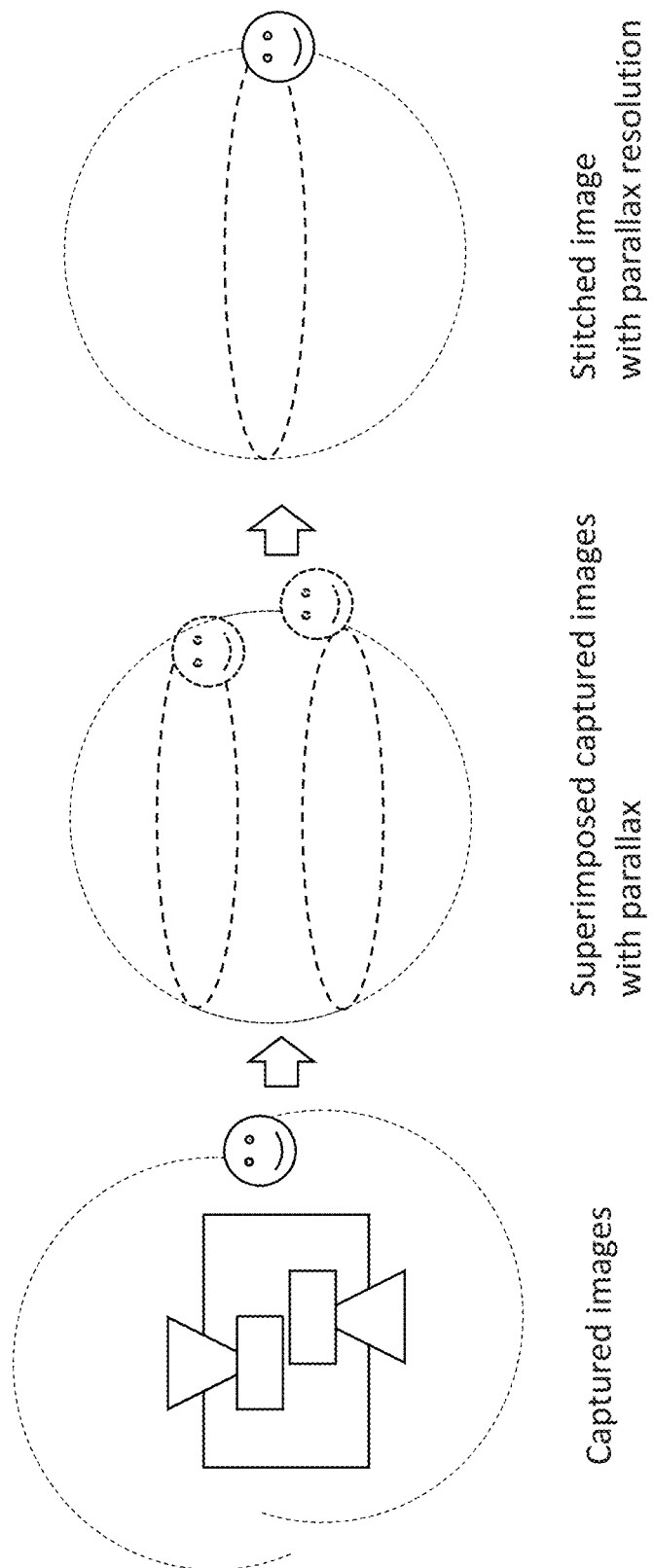
FIG. 1 is a graphical illustration depicting the resolution of parallax for captured panoramic content, in accordance with the principles of the present disclosure.

The "in-camera" stitching process may assume a constant depth of all objects present in the captured images which may be sub-optimal. More specifically, depth information, once the captured images have been stitched, may be lost during processing of the captured images, so that each object captured redundantly is presumed to be at the same distance. As an example, consider an object that is captured by two capture devices where the edge or seam of the resulting images are misaligned. The image capture devices 202a, 202b may not have the same line of sight to the object. That is, for example, the object may be closer to one image capture device than the other, or the capture devices may not be completely flush against each other (see, e.g., the configuration of FIG. 1). During stitching of these two captured images, parallax must be resolved. Moreover, the stitched output file cannot be re-stitched after having lost depth information as this information is lost once the image has been transferred off the camera system 200.

"In-Phone" Stitch—

Figure 3:
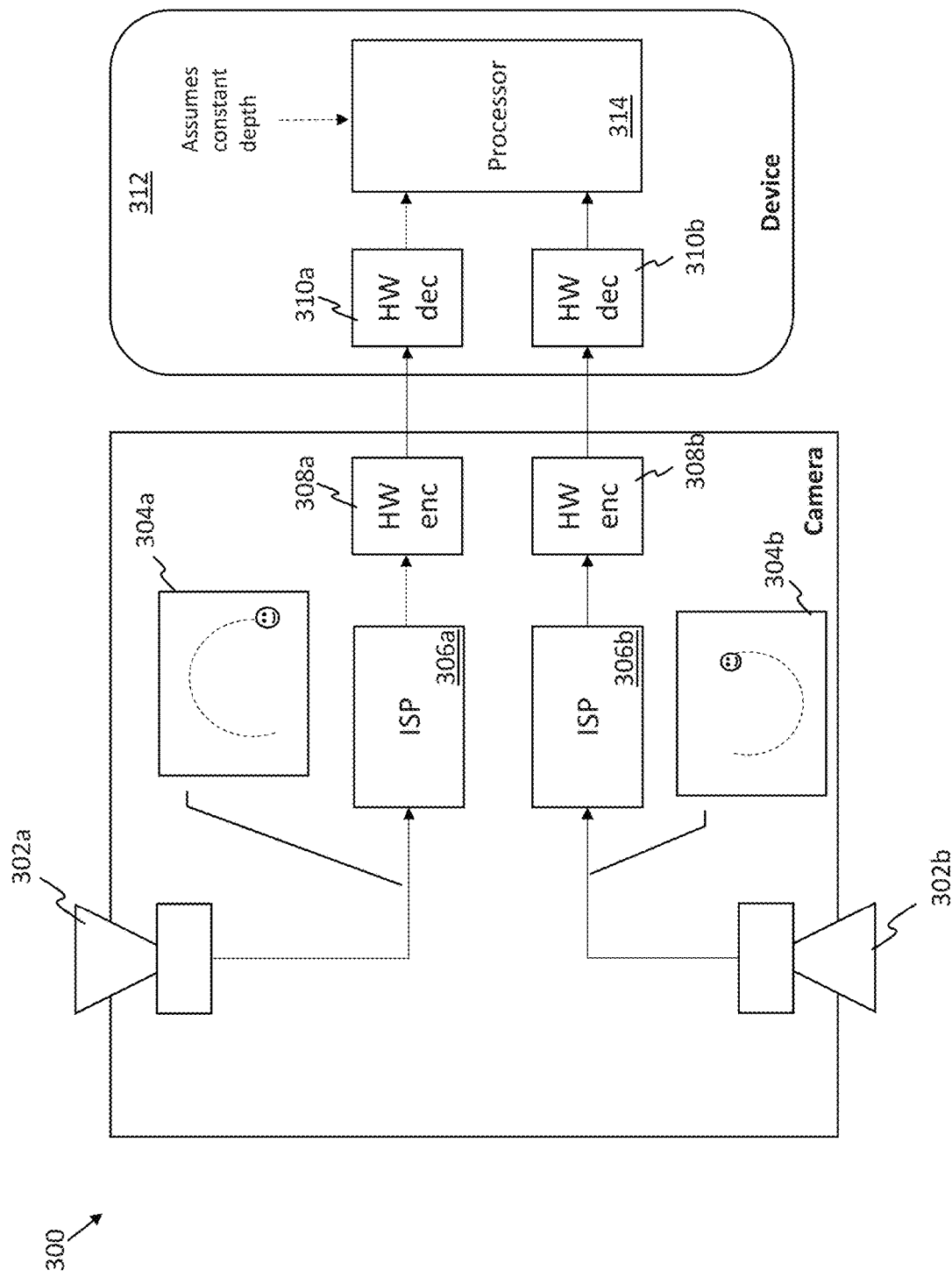
FIG. 3 is a block diagram of one exemplary spherical camera system that performs off-camera stitching, in accordance with the principles of the present disclosure.

FIG. 3 illustrates a block diagram of a camera system 300 for delivering captured images for stitching on a user device 312. In one embodiment, two (or more) capture devices (e.g., fisheye cameras) 302a, 302b of camera system 300, may capture respective hemispheric fisheye images and/or video content 304a, 304b. In one implementation, these capture devices may be oriented substantially back-to-back so as to capture opposite sides of the camera system 300. Each of the natively captured imaging content 304a, 304b may be fed to a respective image signal processor (ISP) 306a, 306b that are in data communication with image capture sensors 302a, 302b. The ISPs 306a, 306b may generate an image file in the same file format as the other ISP. Such image file formats may include, but are not limited to, JPEG/JPG, PNG, BMP, TIFF/TIF, and GIF. The ISPs 306a, 306b may generate video file(s) that are in one of various formats including MP4, MPEG, AVI, or MOV formats. Yet other known file types may be used as would readily appreciated by one of ordinary skill given the contents of the present disclosure.

In some variants, a given ISP 306 may be configured to generate images that may be used by encoders, processors, other hardware accelerators, and/or logic resident on the camera system 300 to render an image (as opposed to, e.g., native fisheye images captured by the imaging sensors 302a, 302b that retain full fisheye information density). In some variants, the received imaging content may be fed into an image splitter to split the captured imaging content into two or more portions, as described in co-owned and co-pending U.S. patent application Ser. No. 15/982,945 entitled "METHODS AND APPARATUS FOR MULTI-ENCODER PROCESSING OF HIGH RESOLUTION CONTENT" and filed May 17, 2018, and co-owned and co-pending U.S. patent application Ser. No. 16/234,396 entitled "METHODS AND APPARATUS FOR MULTI-ENCODER PROCESS- ING OF HIGH RESOLUTION CONTENT" and filed Dec. 27, 2018, each of the foregoing being incorporated herein by reference in its entirety.

In the "in-phone" stitching performed by camera system 300 as shown in FIG. 3, each ISP 306a, 306b feeds the generated images (e.g., JPEG images) or video content to a respective encoder 308a, 308b. Each encoder 308a, 308b receives a portion of the image or video that will be eventually be stitched. In one embodiment, the encoders may be hardware encoders or other hardware accelerators. In another embodiment, the encoders may be encoder instances run by software or logic. The output of these encoders 308a, 308b (encoded portions of the generated images) may then be delivered to respective decoders 310a, 310b that are located on another device, e.g., a user device 312 such as a smartphone, laptop, tablet, smartwatch, IOT device, or another user device. These encoders and decoders may be configured to process one or more of various types of formats, such as, for example, H.265/MPEG-H HEVC; H.264/MPEG-4 AVC; H.263/MPEG-4 Part 2; H.262/MPEG-2; Microsoft® encoders; Google® encoders and/or various other types of encoders and decoders.

After the encoded portions of imaging and/or video content are received by the user device 312, the decoders 310a, 310b decode the content and feed it to a processor apparatus 314 of the user device. The processor apparatus 314 may then proceed to stitch the decoded portions. The processor apparatus 308 of the user device may stitch each of the generated images (or video frames) into, for example, a 360° image having the same file format as those generated at the ISPs (e.g., JPEG). In some variants, the resulting image may be a different format for consumption by the user device 312. This results in a stitched image for consumption or display by the user device 312 or yet another device (e.g., another user device, a separate display device, etc.).

In alternate embodiments, the encoded content may be transmitted to other types of devices, e.g., a server, local storage device, workstation, another camera system. The content may then be further transmitted to yet other devices, or retrieved or accessed by a user device (e.g., 312) for processing. However, this "in-phone" stitching may prove suboptimal as the hardware architecture of the device 312 may not be optimized for these stitching processes.

To achieve "in-phone" stitching, the processor 314 may perform pattern matching. One type of pattern matching includes finding a corresponding pixel for each pixel of one image by the processor apparatus 314. However, this may introduce a complication in which the pixels of the generated image file may be distorted or depreciated as compared to originally captured pixels. For example, at least some pixels of a resulting JPEG image may have been interpolated or extrapolated during conversion to JPEG. Hence, pattern matching may become computationally expensive for the user device that traditionally lacks processor, power, and memory resources compared to, e.g., desktop workstations. While the foregoing "in-camera" or "in-phone" stitching mechanisms may nonetheless be viable with use in existing hardware, further improvements may be made with software to reduce computational burden during post-processing and to enhance user experience.

Optimized Stitching with Warp—

FIGS. 4A-4D illustrate an exemplary embodiment of a pipeline in which a "warp file" is generated for enabling optimized stitching of overcapture content. The pipeline 400 of FIG. 4A may include one or more of the following procedures.

In some implementations, overcaptured content (e.g., fisheye images 402a, 402b) may be captured by an image capture device. For a given captured image, or for each frame of captured video content, areas of overlap may be identified and isolated to produce respective overlap bands 404a, 404b. The overlap bands may be rectangular (e.g., equirectangular) image projections of the area of overlap where the content of the image capture devices 202a, 202b, 302a, 302b overlap.

The overlap bands 404a, 404b may be downsampled and/or downscaled by a respective image signal processor (ISP) 206, 306 of the image capture device to produce respective downsampled images 406a, 406b. As but one non-limiting example, the downsampling may take an overlap band produced from a fisheye image having, for example, a 2.7K resolution (e.g., 2704×2028 pixels or 2704×1520 pixels) and downscale it such that the width is, for example, 1024 pixels width and 149 pixels in height. In other words, a downsampled image may have a resolution of 1024 pixels×149 pixels. However, myriad other resolutions are of course possible in other implementations. The downsampled image 406a, 406b correlates to the capture resolution and may reduce file size by multiple-fold by virtue of reducing the pixel size of each dimension. As a brief aside, wide-angle video content captured at 2.7K and 120 FPS (as opposed to, e.g., 4K at 30 FPS) using capture devices manufactured by the Assignee hereof may allow for the "slowing down" of footage captured, up to four times (4×) for enhanced user experience, and additionally allow for the content or frames thereof to be cropped in HD resolution (e.g., 1440p or 1080p). Moreover, in some implementations, downsampling may not be performed; i.e., the overlap band may simply be cropped from its original 2.7K resolution. In other implementations, other native resolutions and downsampled resolutions may be used as desired.

Using downsampled images may result in more rapid generation of derivative images and may improve the optimization of the stitching process. Although using derivatives images in their native resolution may result in marginally greater image quality, warped stitch lines need not be precise in order to generate the stitched images at an acceptable quality level.

Derivative images 408a, 408b may be produced by the ISP 206, 306 from the downsampled images 406a, 406b. Derivative images may be indicative of differences between pixels within the downsampled images. Put differently, derivative images 408a, 408b contain data regarding features detected in the downsampled images. In one embodiment, edge detection (using, e.g., an edge filter) based on intensity changes between two neighboring pixels may be used. In other embodiments, first- and second-order derivatives may be used to detect gradient magnitudes and edges. In some variants, a threshold magnitude or amount of change may be required to detect the edge. Other techniques such as phase stretch transform (PST), Kirsch operator, noise reduction, and smoothing (e.g., Gaussian) as known by persons having ordinary skill in the relevant imaging arts may be used for feature detection.

Derivative images 408a, 408b may be used by the ISP(s) to generate a cost map 410. In one embodiment, the cost map 410 contains data representative of differences between the derivative images 408a, 408b. In essence, the derivative images contain edges of features in the respective overlap bands, and the cost map 410 contains differences between the overlap bands, pattern matching facilitated by the feature detection. The cost map 410 may be placed in storage (e.g., memory, buffer) of the capture device(s) or an image capturing system that utilizes the capture devices.

It will be appreciated that derivative images may be unnecessary to generate the cost map 410 if another type of depth information or estimation is provided. For example, a distance map showing the depths of the objects that are present in the overlap band or the downsampled version thereof may obviate the need to generate derivative images for feature detection. Depth may also be calculated based on the distance between multiple lenses viewing the same scene in such configurations. Other alternatives for generation of depth information may be utilized, including via sonar, lidar, radar, and other known types of generating depth information.

Figure 4A:
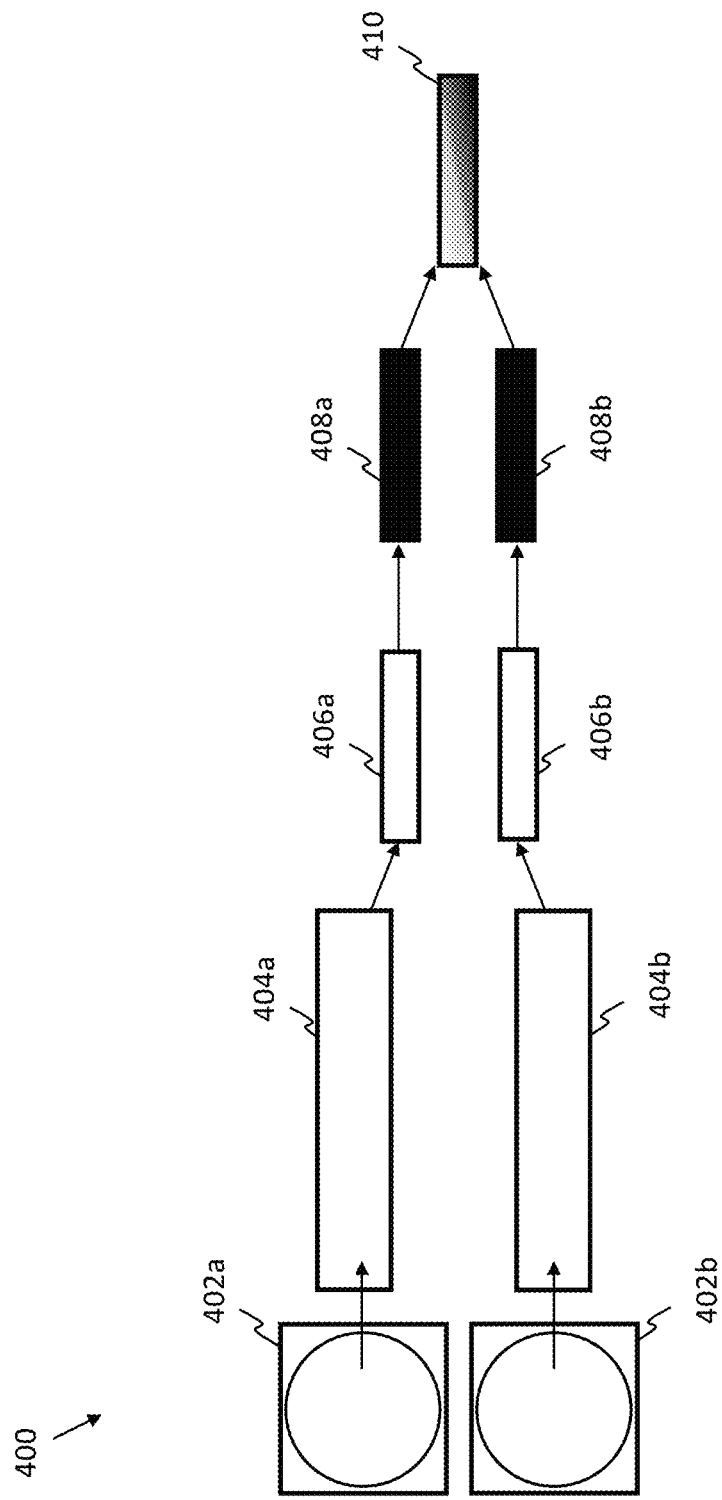
Figure 4B:
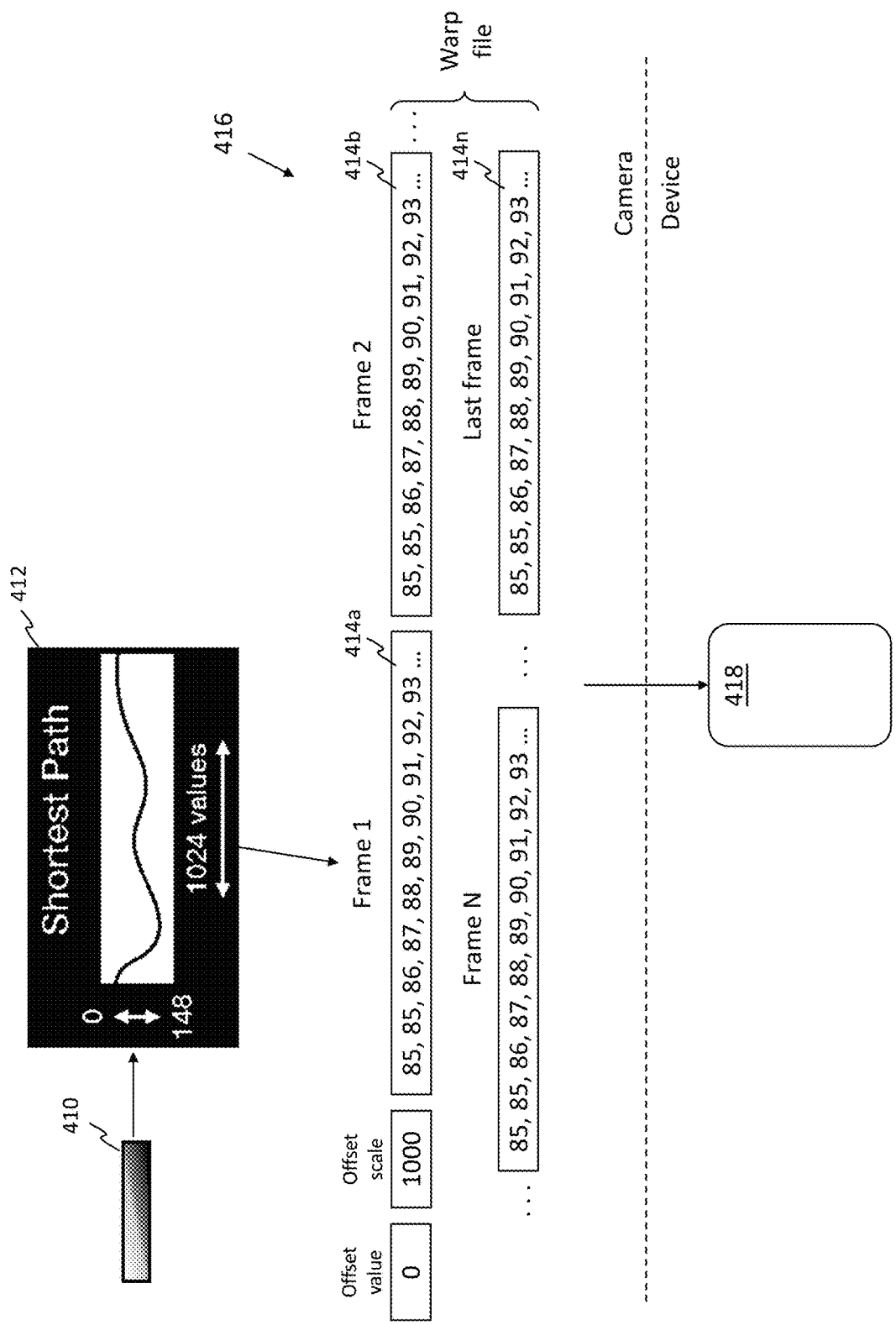

Turning now to FIG. 4B, the ISP(s) may generate a shortest path file 412 based on the cost map 410. As used herein, the "shortest path" is an algorithm for generating a curve that represents a stitch line through the overlap band such that the sum of the weights of the arcs on the path of the stitch are minimized. In some implementations, the shortest path file 412 may be viewed as a graph having one-hundred and forty-nine (149) values (e.g., from 0 to 148) corresponding to the location of the stitch to be made across 1024 values, representing 1024 pixels of the downsampled image. The ISP(s) 206, 306 may then generate a string of unsigned character values (e.g., integers) 414a representing the shortest path value corresponding to the location of the stitch in the cost map of the image or video frame. These values are written into metadata, e.g., in a "warp file." Strings for any additional frames may be written into metadata in a similar manner.

A warp file 416 is generated based on the foregoing metadata. In one exemplary embodiment, the warp file may include a respective string 414a-414n for each frame. The warp file may also include an offset value and an offset scale indicative of temporal locations of the frames, time value, timestamp, duration, frame location, length of frame, an identifier of the capture device(s), file location, and/or other parameters (network parameters, IP addresses, MAC addresses, etc.).

Hence, a file that contains metadata (e.g., a string of values) for each frame is generated. In the exemplary embodiment, the warp file 416 is stored in memory of the capture device(s) or the image capturing system. The warp file 416 may be transmitted to another device 418, such as a user device, workstation, etc., via wired or wireless communication. In some variants, the transmission may be a result of a request by the other device. The warp file 416 may have a file size that is magnitudes smaller than the overcapture content, making the warp file ideal for lookup retrieval at a later time. The warp file 416 may be significantly smaller than data contained in the cost map 410 as well. More specifically, the cost map 410 may contain RGB values, floats (i.e. decimals), while the aforementioned metadata only contains a string of integers. Advantageously, this may allow the other device to look up the metadata contained in the warp file and apply it to stitch the captured content, rather than processing the content on the other device, as will be further discussed below. This may further reduce or eliminate any perceived lag by a user during computationally expensive image processing (including, e.g., shortest path calculation), as most of the intensive computations will have been finished on the capture derive (s) before the metadata is retrieved and applied by, e.g., user device software. In many cases, the user may perceive "real time" stitching of overcapture content as a result. Put another way, the user device may bypass the generation of cost map and production of the shortest path, which may be better suited for devices that are less limited by power resources and/or computational power.

In a different embodiment, the cost map 410 may be transmitted to another device before the shortest path data is derived. This may allow offloading of processing resources away from the capture device(s) and/or the image capturing system and onto, e.g., the user device.

In FIG. 4C, an exemplary receiving device (e.g., user device 418) retrieves and reads the metadata 414 contained in warp file 416 to produce a displacement map 420. In one exemplary embodiment, the user device 418 has already received the captured content 402a, 402b, e.g., immediately after capture, while the ISP are processing the overlap bands, downsampling, etc. The user device 418 may also receive the captured content 402a, 402b at this point along with the warp file 416.

In one exemplary embodiment, the displacement map 420 is determined from the values in the metadata 414 corresponding to a given frame. More specifically, portions of the displacement map 420 correspond to locations on one of the previously generated overlap bands. In some embodiments, the integers in the metadata 414 are converted to floats for greater precision. Interpolation between values may be used to generate the floats. In the displacement map 420, areas within the displacement map indicate whether the overlap band should be shifted in a particular direction relative to the other overlap band. For example, a first area 422 has a first color that indicates that that area of the overlap band is to be shifted in the y direction, i.e., up or down. A second area 424 has a different color that that indicates that that area of the overlap band is to be shifted in the x direction, i.e., left or right. A third area 426 has the first color, again indicating that the area should be shifted in the y direction. A fourth area 428 has no color, which indicates that there is no x or y displacement to be made.

In one exemplary implementation, the user device 418 generates projections (e.g., equirectangular) from the fisheye content (e.g., captured content 402a, 402b). The user device 418 may apply the x, y displacements on the captured content 402a, 402b based on the displacement map 420. By applying the displacements, a warp is applied when generating the projections.

Figure 4D:
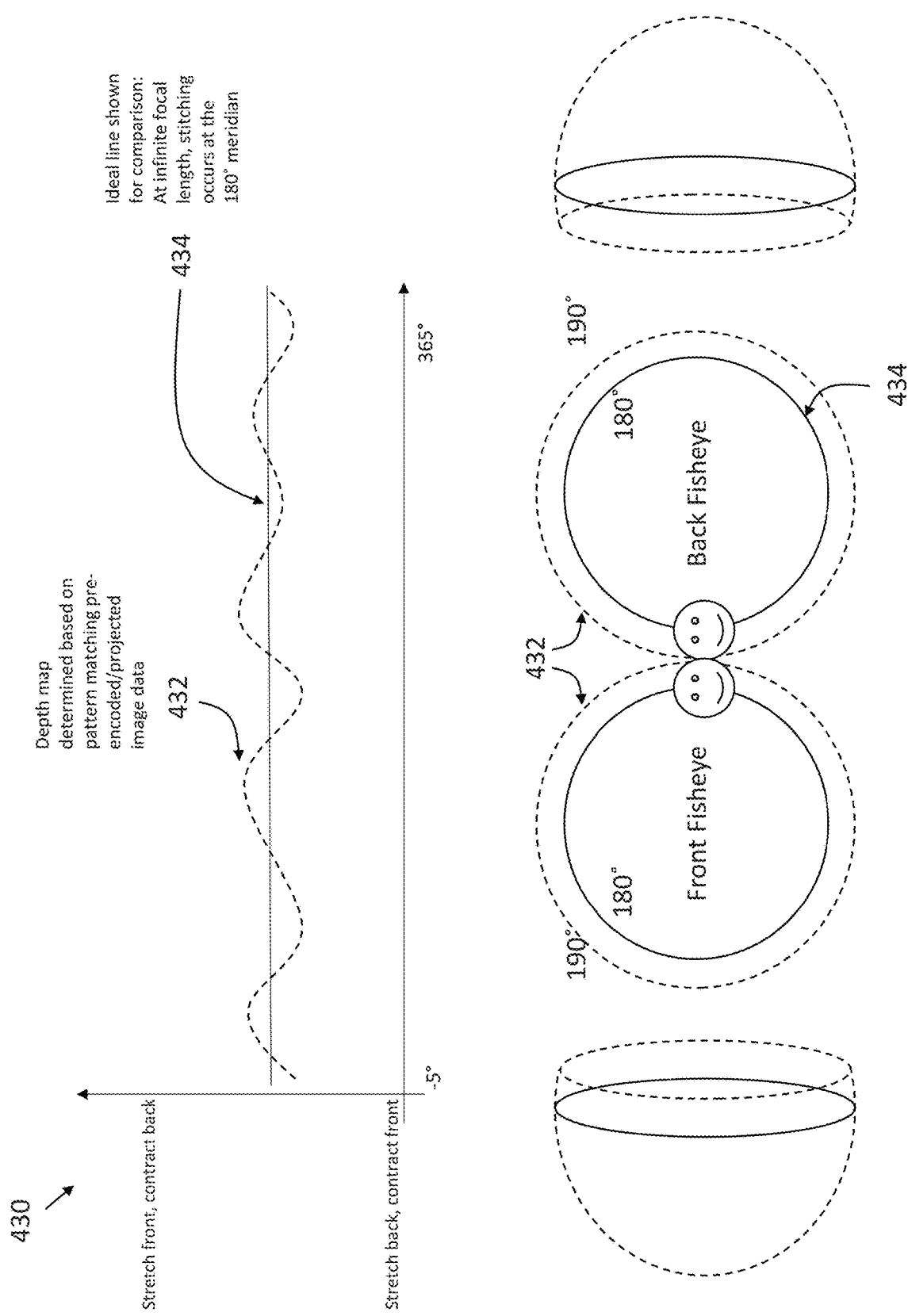

FIG. 4D illustrates a graph of a stitch line 432 representing the resulting warp 430 applied to the captured content by the receiving device (e.g., user device 418) when generating the projections. Based on the displacement map 420, portions of the overlap band may be stretched or contracted so as to create an overlap that does not create artifacts in the stitched image, such as duplicative features (e.g., an object appearing twice near the stitch) or incorrect depths (e.g., an object that was in front of another object appearing behind instead). For comparison, an ideal stitch line 434 with no warping applied is also shown.

Figure 5:
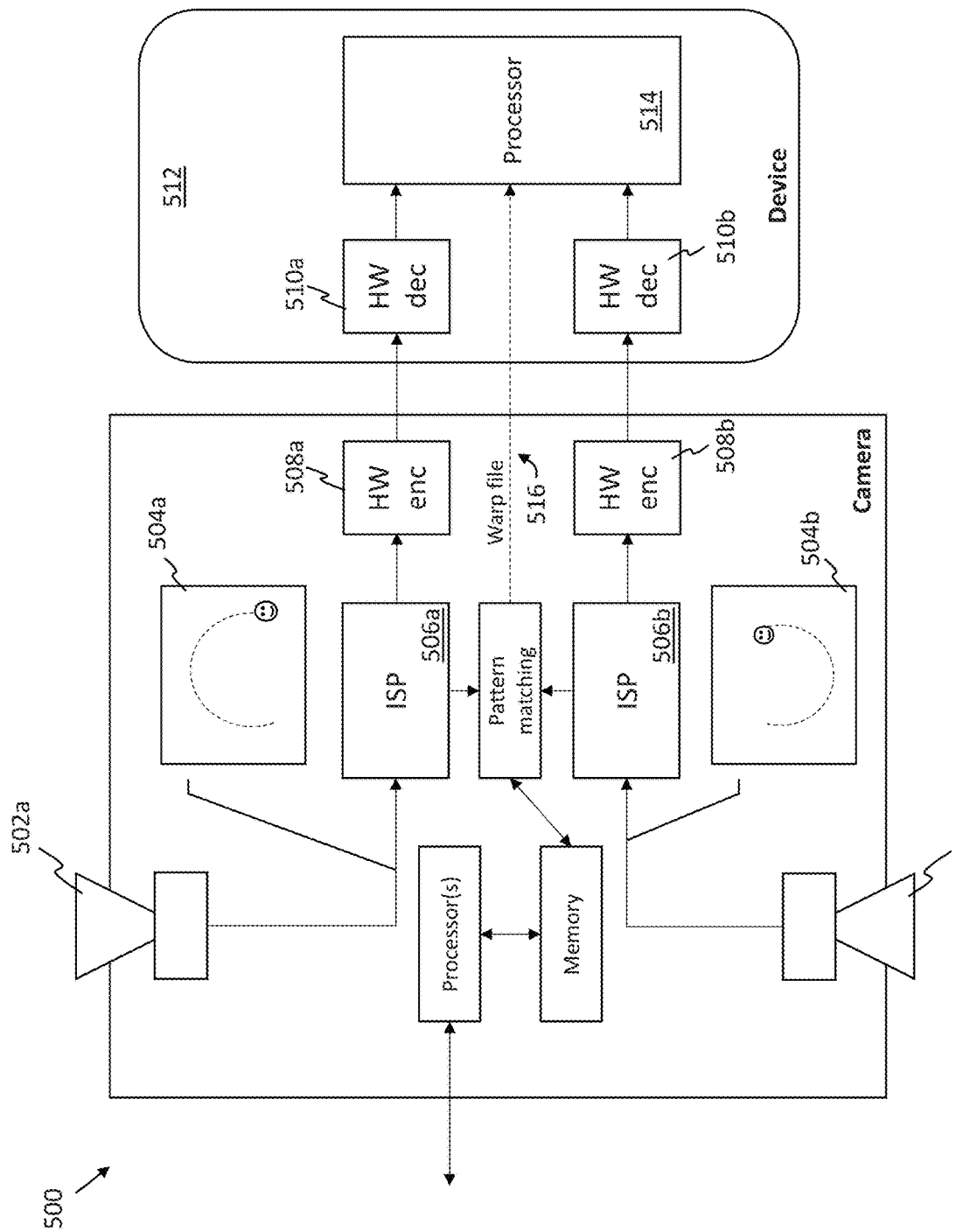
FIG. 5 is a block diagram of one exemplary spherical camera system that generates warp track files, in accordance with the principles of the present disclosure.

FIG. 5 illustrates a block diagram of a camera system 500 for delivering image content to a user device using a warp file. In one exemplary embodiment, two (or more) capture devices (e.g., fisheye cameras) 502a, 502b of a camera system 500 may capture, for example, respective hemispheric fisheye images and/or video content 504a, 504b. In one implementation, these capture devices may be oriented substantially back-to-back so as to capture opposite sides of the camera system 500. Each of the natively captured imaging content 504a, 504b may be fed to a respective image signal processor (ISP) 506a, 506b in data communication with the capture devices. A capture device and an ISP may be in wired or wireless data communication. The ISPs may generate an image file in the same file format as the other ISP. Such image file formats may include but are not limited to, JPEG/JPG, PNG, BMP, TIFF/TIF, and GIF. The ISPs may generate video file(s) that are in one of various formats including MP4, MPEG, AVI, or MOV formats. Yet other known file types may be used.

In many variants, a given ISP may be configured to generate images that may be used by encoders, processors, other hardware accelerators, or logic resident on the camera system 500 to render an image (as opposed to, e.g., native fisheye images captured by the capture devices 502a, 502b that retain full fisheye information density). In contrast to the aforementioned "in-camera" stitch and the "in-phone" stitch mechanisms described above with respect to FIGS. 2 and 3, the optimized stitching mechanism includes pattern matching by the ISP(s), i.e., feature detection, depth calculation, shortest path calculation, and/or generation of cost map generation, warp file, and displacement map.

In one exemplary embodiment, the captured content may be encoded by encoders 508a, 508b and then be delivered to respective decoders 510a, 510b that is on another device. The captured content may be stitched in some implementations. The stitching may be a lower quality stitch. A warp file 516 generated by the ISP(s) is also transmitted to the other device 512. The warp file 516 may allow for a user device 512 to perform a higher quality stitch than the lower quality stitch performed by the camera system 500. In one particular embodiment, the other device is a user device 512 (e.g., smartphone, laptop, tablet). The content may be transmitted to and received by other types of devices in various other embodiments, including, e.g., a graphics workstation, another camera system, or a storage location (e.g., server apparatus, or local memory of camera system 500). The content may then be further transmitted to yet other devices, or retrieved or accessed by a user device (e.g., 512) for processing.

After the encoded portions of imaging and/or video content are received by the user device 512, the decoders 510a, 510b decode the content and feed it to a processor apparatus 514 of the user device. The processor apparatus 514 additionally receives the warp file 516 to effectuate stitching of the decoded contents. The processor apparatus 514 may then proceed to stitch the decoded portions using at least the warp file 516. The processor apparatus 514 may further generate a displacement map (e.g., 420) and apply the displacement map to the contents to generate a stitched projection image (or frame of a video). For instance, the processor apparatus 508 of the user device may stitch each of the generated images (or video frames) into a 360° image having the same file format as those generated at the ISPs (e.g., JPEG). In some variants, the resulting image may be a different format for consumption by the user device 512. This results in a stitched image for consumption or display by the user device 512 or yet another device (e.g., another user device, a separate display device).

The foregoing stitch is thereby optimized via the use of the warp file 516 containing metadata that enables the user device 512 to simply retrieve a small amount of metadata to create a "real time" feel. As alluded to above, the warp file enables the ISP on the camera side to process the stitching of the captured content and write the associated information to separate metadata. The metadata may be transmitted separately from the content to the user device, shown by the dotted arrow, thereby (1) avoiding transmission of large amounts of stitched content (e.g., 210) and (2) avoiding stitching of content on a user device that may be limited in computing resources (e.g., processing power, memory), net- working resources (e.g., connectivity, bandwidth), and/or power (e.g., battery capacity or charge). The user device may retrieve the warp file as a lookup rather than having to receive large stitched files or performing all the stitching.

Discrete Vs. Integrated Memory—

Figure 6:
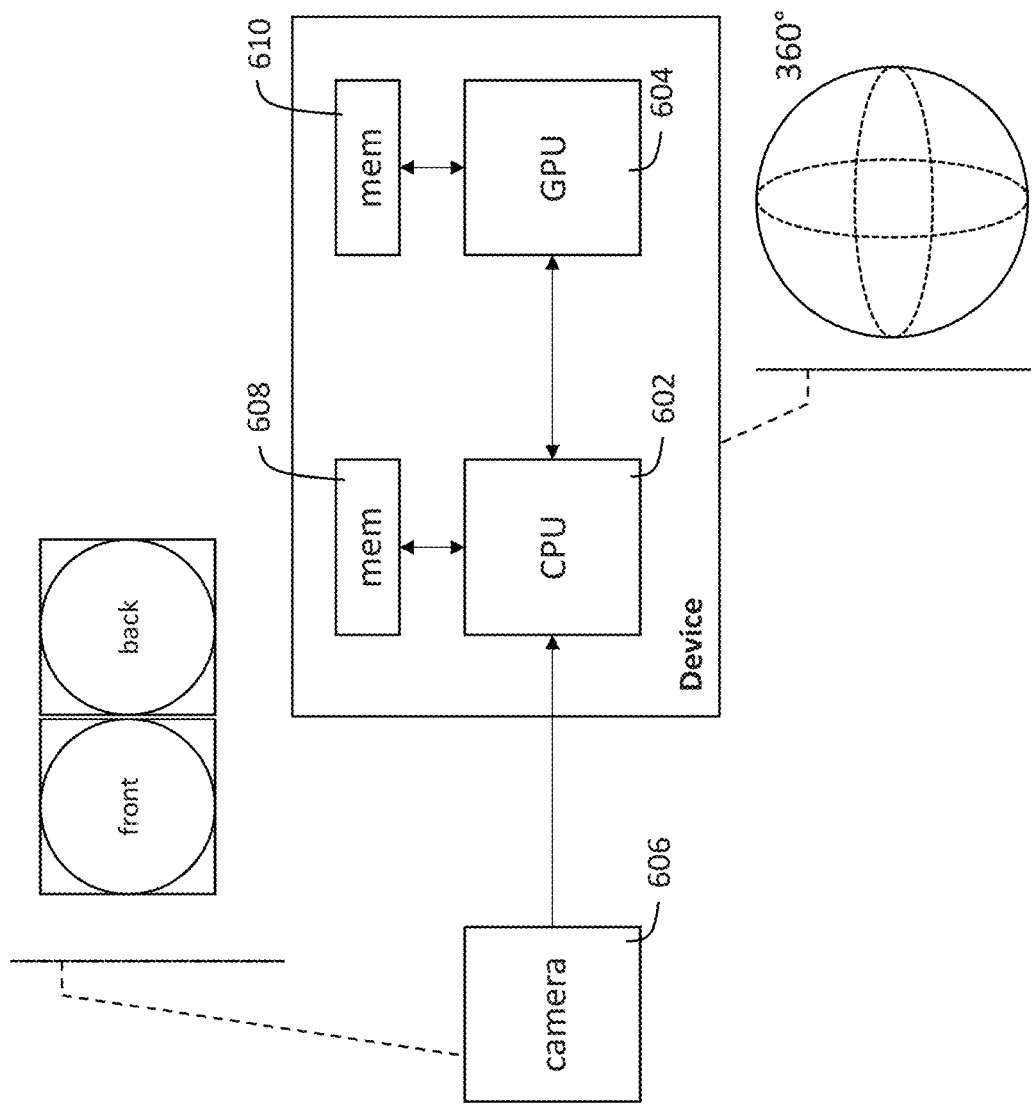
FIG. 6 illustrates one exemplary system architecture for memory management between a central processing unit (CPU) and a graphics processing unit (GPU), in accordance with the principles of the present disclosure.

FIG. 6 illustrates the current paradigm for memory management between a central processing unit (CPU) 602 and a graphics processing unit (GPU) 604 configured to process captured imaging content. As can be seen, a camera system 606 having, for example, two fisheye image capture devices may capture image and/or video content, and transfer the captured content to a device having a CPU that is communicative with the camera system. CPUs are typically characterized by general logic (e.g., execution of instructions, sorting and transfer of data, logical operations). In one implementation, the CPU may perform the stitching. On the other hand, many GPUs are typically characterized by dedicated hardware acceleration. In one implementation, encoding and decoding of image and video content may be performed by the GPU. Much of modern computerized architectures provide different pools of memory to the CPU and the GPU. FIG. 6, for example, shows that each of the CPU and the GPU has its own respective discrete storage apparatus 608, 610 (e.g., memory module). Separate memories allow independent operation with minimal resource contention between the CPU and GPU.

As an aside, each of said storage or memory apparatus may include any type of integrated circuit or other storage device adapted for storing digital data including, without limitation, random access memory (RAM), dynamic RAM (DRAM), synchronous dynamic RAM (SDRAM) including double data rate (DDR) class memory and graphics DDR (GDDR) and variants thereof. Memory devices may be volatile or non-volatile. Non-volatile memory (e.g., flash memory) can store data for extended periods of time even in the absence of an external power source.

However, this existing solution requires processing time that is bottlenecked by the memory interface(s) and the transfer of contents between the memory 608 associated with the CPU and the memory 610 associated with the GPU. For example, the CPU and GPU may exchange image data to perform their respective roles, e.g., stitching and decoding content, respectively. This may require additional power and time to process and transfer data, especially when there are numerous discrete files or images (e.g., up to 120 frames per second) or large files (e.g., gigabytes of captured video content).

Hence, one challenge with having separate memories is accounting for any processing delays and burdens associated with repeated usage spikes of processing and memory resources when stitching using higher-end architectures. To that end, implementations utilizing a common resource (e.g., via use of an integrated graphics processor unit) may bring about an unexpected benefit of reducing processing and memory resources required to produce stitched content.

Figure 7:
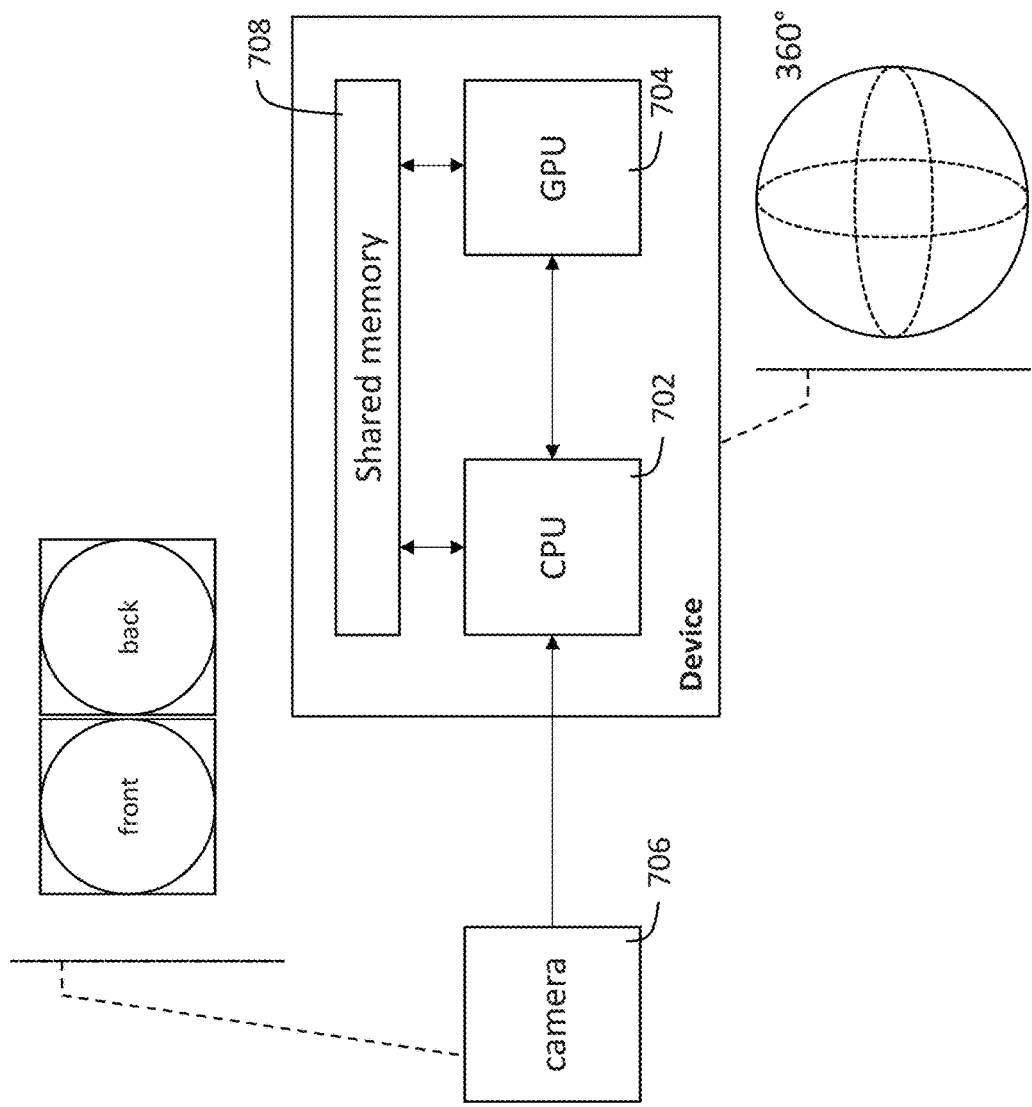
FIG. 7 illustrates another exemplary system architecture for memory management between a CPU and a GPU, in accordance with the principles of the present disclosure.

FIG. 7 illustrates an exemplary embodiment of one such architecture for use with a camera system configured to process captured imaging content (e.g., overcapture content). A camera system 706 having two fisheye capture devices may capture image and/or video content, and transfer the captured content to a device (e.g., user device) having a CPU 702 that is communicative with the camera system 706. In one implementation, the CPU 702 may perform the stitching, and encoding and decoding of image and video content may be performed by the GPU 704. In contrast to much of modern hardware that provides different pools of memory to the CPU and the GPU, the illustrated architecture provides a shared memory 708 for use by both the CPU 702 and the GPU 704. Advantageously, the foregoing architecture allows, for example, captured content decoded by the GPU to be stitched right away by the CPU because it is accessible at the same pool of memory. Moreover, such a solution of using shared memory between the two processing units would be less costly compared to a dual-memory implementation. The bottleneck in the embodiment of FIG. 7 would be shifted to the speed (e.g., clock rate) of the CPU or the GPU itself. Hence, the foregoing embodiment is useful with the present disclosure with respect to the optimized stitching methodologies described above and further described in detail below.

Methods—

Figure 8A:
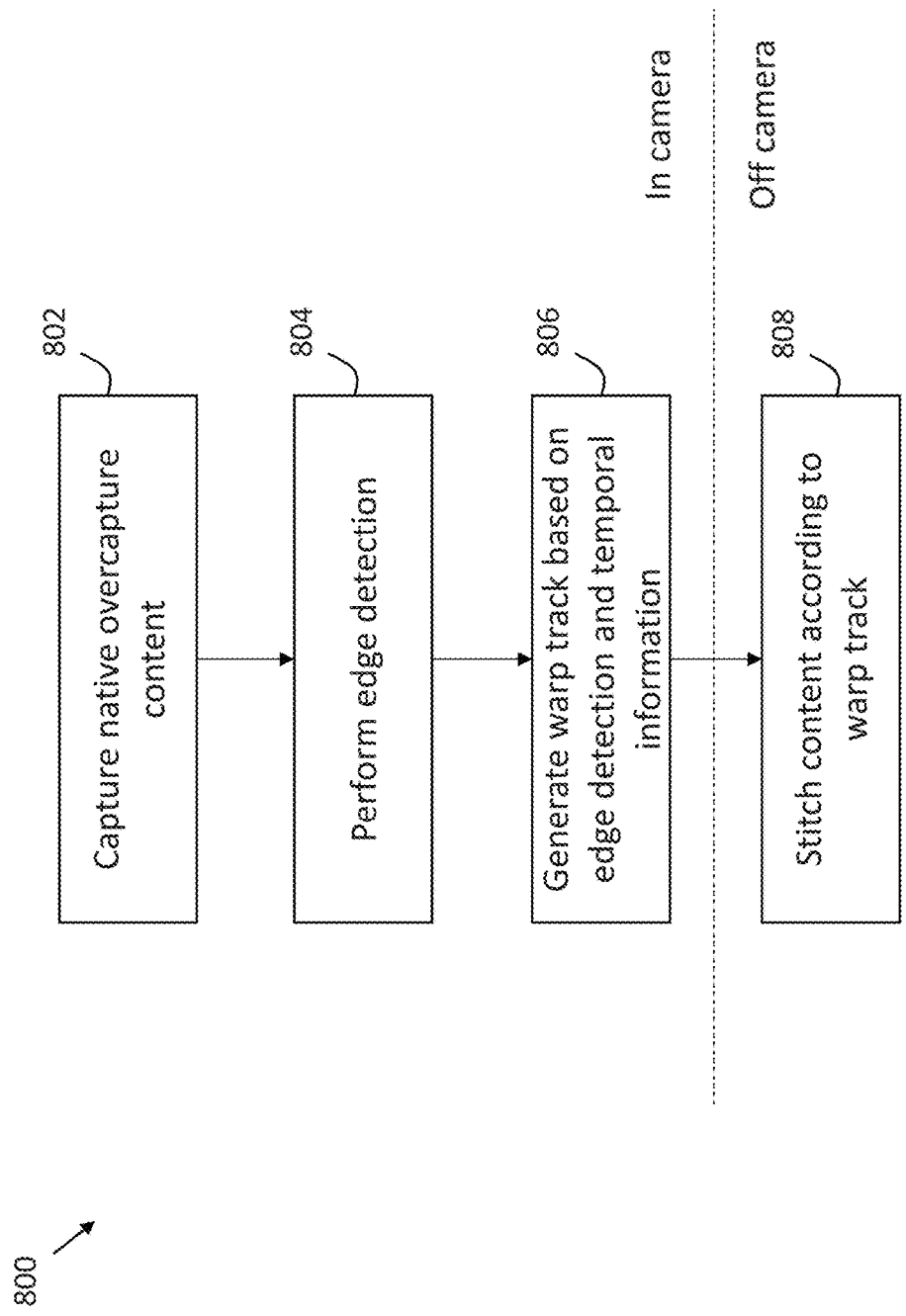
FIG. 8A is a logical flow diagram illustrating one exemplary method for the stitching of content according to a warp track file, in accordance with the principles of the present disclosure.

FIG. 8A illustrates an exemplary methodology 800 for an optimized stitching of overcapture content using a camera system.

At step 802, a camera system captures native overcapture content. In one exemplary embodiment, overcapture content may be captured by a fisheye lens of a capture device that captures content beyond 180°, resulting in, e.g., hyper-hemispheric imaging content. A camera system may include a plurality of capture devices. In the exemplary embodiment, a camera system may utilize two (or more) capture devices. In one variant, the camera system captures two hyper-hemispheric images and/or video from a "front" and a "back" side, where the capture devices are placed back to back, thereby capturing a 360° environment. In some implementations, the capture devices may not be completely flush against each other, resulting in distortions in depth between the two captured images. For example, an object at the edge of each captured content may appear farther or closer than the other, resulting in parallax as discussed elsewhere herein. Furthermore, in many embodiments, the captured native content may be converted to a projections (e.g., equirectangular).

At step 804, the camera system performs edge detection. In one exemplary embodiment, an image signal processor (ISP) of the camera system receives the captured content from a corresponding capture device, and performs one or more operations in order to detect edges or features of the captured content.

In one exemplary variant, each ISP is communicative with the capture devices and may produce an overlap band that represents an area of overlap between the two (or more) captured content (e.g., frames of video or still images captured by capture devices). The overlap bands may be projected into (or cropped if already projected) rectangular (e.g., equirectangular) image projections of the area of overlap of one overcapture content with respect to the other overcapture content. Such a projection may be necessary to compensate for any curved portions of the content.

Next, each ISP may downsample and/or downscale the overlap band to produce a downsampled image. The downsampled image may correspond to an image whose dimensions are reduced as compared to those of the overlap band. In this case, the downsampled image may reduce file size by multiple-fold. In one implementation, the downsampled image may have dimensions of 149×1024 pixels, downscaled from a width of 2048 of 2.7K resolution of fisheye projections.

Each ISP may further generate a derivative image for the downsampled image. Derivative data may be produced by detecting edges (i.e., features) of objects in the image. In one embodiment, edge detection (using, e.g., an edge filter) based on intensity changes between two neighboring pixels may be used. In other embodiments, first- and second-order derivatives may be used to detect gradient magnitudes and edges. In some variants, a threshold magnitude or amount of change may be required to detect the edge. Other techniques such as phase stretch transform (PST), Kirsch operator, noise reduction, and smoothing (e.g., Gaussian) as known by persons having ordinary skill in the relevant imaging arts may be used for feature detection.

However, it will be appreciated that other alternatives for depth information or estimation may be utilized, including sonar, lidar, radar, etc. Thus, in some embodiments, generating derivative images may be unnecessary if the camera system obtains depth information, e.g., distance map, depth map, data from stereoscopic imaging (e.g., two capture devices per "front" and "back" side).

Returning to FIG. 8, the camera system may generate a warp track for each image or video frame at step 806. In one embodiment, the ISP(s) first generate a cost map containing data representative of differences between the derivative images. In another embodiment, the cost map may be generated based on other types of depth information as discussed above. The cost map may enable pattern matching between, e.g., the two captured contents, thereby reducing the parallax effect and reducing or eliminating duplicate features captured in both overcapture contents.

The cost map may be used by the camera system to generate a shortest path. The shortest path represents a stitch line through the overlap band such that the sum of the weights of the arcs on the path of the stitch is minimized. In some embodiments, the shortest path may be represented as a graph having values corresponding to the location of the stitch to be made across the downsampled image. The graph may have 149×1024 pixels or values, corresponding to those of the downsampled image. Further, a string of integer values representing the shortest path may be generated and written into metadata, e.g., in a "warp file." For example, the first value in the string may correspond to the first pixel across the x axis of the graph, the second value may correspond to the second pixel, etc. Temporal data indicating, e.g., temporal locations of the frames, time value, timestamp, duration, frame location, length of frame, may also be written to the metadata and/or generated when the warp file is created. Identifying information and/or values corresponding to other frames (e.g., subsequent frames in a video content) may also be written into the warp file.

The warp file may be placed in local storage associated with the camera system for later retrieval by the camera system (e.g., to write additional values) or by another device, such as a user device (e.g., mobile device), another camera system, a server apparatus, or a workstation.

Advantageously, the warp file may be magnitudes smaller in size compared to the content itself. Moreover, the warp file is easily retrievable or transmittable to other devices.

At step 808, the two "front" and "back" contents are stitched according to the warp file. In one exemplary embodiment, the warp file is transmitted to a receiving device, e.g., a user device (e.g., smartphone, laptop, tablet). The captured contents (e.g., captured images or video frames) are also transmitted to the user device. In one variant, the captured contents may be transmitted immediately after capture (i.e., immediately after 802 and before or during steps 804 and 806). In the optimized stitching methodology, metadata is retrieved for stitching at the user device. Hence, the user device need not wait for transfer if bandwidth is available. However, in some implementations, the transfer may occur only when available bandwidth, memory, or other network parameters (e.g., connectivity or signal strength between camera system and user device)

meet or exceed a prescribed criterion (e.g., threshold). In another variant, the captured contents may be transmitted along with the warp file after the generation of the warp file. However, these contents are not stitched at the camera system, nor are they processed at the user device. Instead, the metadata contained in the warp file is used to generate the stitched image.

In one embodiment, the values contained in the warp file may be used to generate a displacement map at the user device. The displacement map may be determined from the integer values in the metadata, corresponding to a given frame. The integer values may be converted to floats, e.g., via interpolation, for greater precision. By applying the displacements indicated by the displacement map, a warp may be applied when generating the projections. For example, certain portions of the overlap band may be shifted in x or y directions. The aforementioned two contents are then stitched by the user device according to the displacement map.

Advantageously, the user device need not process the stitch line using its limited computational resources and power. Rather, it need only retrieve a relatively small amount of metadata as needed (codified in, e.g., the warp file) that allows it to stitch without processing the stitch line. At the same time, the camera system performs resource-intensive processes that it is suited for (using, e.g., CPU and integrated GPU sharing a single memory) such as generating a warp file for the captured images and/or frames based on the shortest path and cost map. When much of the stitching process is pre-processed up front and only the necessary data is retrieved as described above, it may result in a stable and "real time" feel for the end user.

Figure 8B:
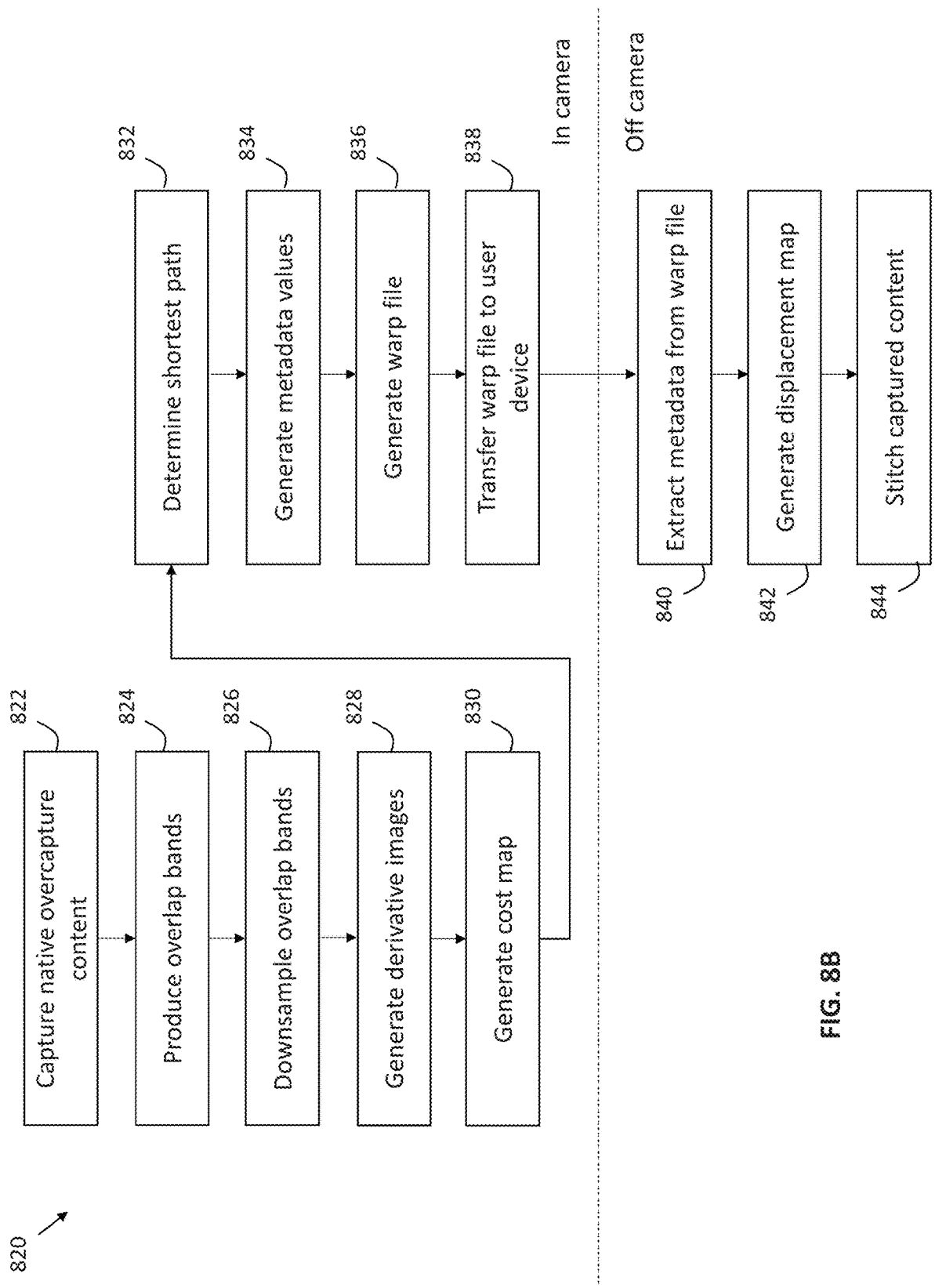
FIG. 8B is a logical flow diagram illustrating another exemplary method for the stitching of content according to a warp track file, in accordance with the principles of the present disclosure.

FIG. 8B illustrates an exemplary methodology 820 for an optimized stitching of overcapture content using a warp file generated by a camera system.

At step 822, the camera system captures native overcapture content. In one embodiment, the overcapture content is captured using two or more capture devices, e.g., fisheye cameras. The capture devices may be placed back to back so as to capture opposite "front" and "back" sides, thereby capturing a 360° environment.

At step 824, the camera system produces overlap bands from the captured content. In one embodiment, one or more image signal processors (ISPs) communicative with the capture devices produce overlap bands based on the areas of overlap between the captured content. In one variant, the overlap bands are projected into an equirectangular projection to account for curves in the overcapture content.

At step 826, the camera system, e.g., via the ISP(s), downsamples and/or downscales the overlap bands to produce downsampled images (or downsampled frames of video for each pair of frames).

At step 828, the camera system, e.g., via the ISP(s), generates derivative images from the downsampled images. Derivative images may represent edges present in the downsampled images. Various feature detection techniques may be used to detect the edges. In some embodiments, other depth information may be received and used to determine depth within the downsampled images.

At step 830, the camera system, e.g., via the ISP(s), generates a cost map. In one embodiment, the cost map contains data representative of differences between the derivative images. The cost map may be useful for subsequent steps, including reducing or eliminating parallax when stitching the captured contents together.

At step 832, the camera system, e.g., via the ISP(s), determines shortest path information. In one embodiment, the ISP(s) generate a shortest path file representative of a stitch line that will be applied to the captured contents. The dimensions of a graph of the shortest path may correspond to the dimensions of the downsampled images (e.g., 1024× 149).

At step 834, the camera system, e.g., via the ISP(s), generates values representative of the shortest path. In one embodiment, the values are integers that may correspond to the value at each pixel across the graph. The values may make up a string for each captured image or each frame of a captured video.

At step 836, the camera system, e.g., via the ISP(s), generates a "warp file." In one embodiment, the string of values generated in step 834 are written as metadata into the warp file. The warp file may contain a string for each image or frame of video content, along with temporal data (e.g., timestamp, time values, offset values, duration, frame location, length of frame) or other identifying information. Thus, the metadata merely includes a string of integers corresponding to the shortest path for each image or frame. The file size of the warp file may be significantly smaller than the cost map which may include data for RGB values and floats. The file size of the warp file may be significantly smaller than the content itself, making the warp file ideal for lookup retrieval at a later time.

At step 838, the camera system transfers the warp file to a receiving device. In one embodiment, the warp file is transmitted to a mobile user device, e.g., smartphone, laptop, tablet, smartwatch, IOT device. In some embodiments, the warp file may be transmitted to a storage location, e.g., local memory, remote server. In some embodiments, the warp file may be transmitted to yet another camera system or a graphics workstation.

At step 840, after the other device (e.g., user device) receives the warp file, metadata containing the strings of values is extracted from the warp file by the user device. In one embodiment, the content is received and decoded at an integrated GPU of the user device.

At step 842, the user device generates a displacement map based on the extracted metadata. The displacement map may be configured to inform the locations and magnitudes of shifts that should occur along the stitch line.

At step 844, the user device stitches the captured content. In one embodiment, the user device has already received the captured content before receiving the warp file. In another embodiment, the user device receives the captured content along with the warp file. In some embodiments, the user device may retrieve the captured content depending on network and/or device conditions, including network parameters (available bandwidth, congestion, etc.) meeting or exceeding one or more criteria (e.g., threshold, minimum or maximum condition met). The end result is a stitched overcapture content with a "warped" stitch line that is displaced or warped in x and/or y directions according to, e.g., the displacement map.

Thereafter, the stitched content may be transferred elsewhere (e.g., a display device, e.g., a virtual-reality headset) or consumed at the user device (e.g., viewed on a screen). Since the stitched content will extend 360 degrees, any view will be a portion viewable through a viewfinder (virtual or otherwise), unless it is converted, e.g., to an equirectangular projection.

FIG. 9 an exemplary methodology 900 for an optimized stitching of overcapture content using a warp file received at a user device.

At step 902, the user device receives overcapture content that has been captured by a camera system. In one exemplary embodiment, the overcapture content includes two (or more) portions of an environment captured by the camera system, each portion having a field of view of over 180°. The user device may receive the content via wired or wireless data connection. In one embodiment, the overcapture content may be received as soon as it is captured by the camera system. However, in other embodiments, the content may be received based on various considerations, e.g., bandwidth availability, or network conditions and parameters.

At step 904, the user device receives from the camera system a "warp file" containing metadata associated with a stitch line. In one exemplary embodiment, the metadata includes strings of integer values corresponding to the shortest path for the stitch. The metadata may also include temporal information, e.g., timestamps, time value, length of frame, frame location.

Advantageously, the user device need only retrieve the warp file as a lookup, e.g., upon a lookup request, when stitching information necessary. This lookup obviates the need to process the contents and determine the stitch line on the user device's GPU, which may significantly reduce computational and power burden on the user device. In other words, much of the intensive processes have been completed by the camera system.

At step 906, the user device stitches the contents according to the metadata in the warp file. The stitch line may be "warped" in x and/or y directions to reduce or eliminate parallax effects (e.g., removing duplicate features).

Exemplary Camera System and Apparatus—

Referring back to the block diagram of FIG. 5, an exemplary camera system 500 able to read instructions from a computer-readable medium and execute them in one or more processors (or controllers). The camera system may represent an implementation of, for example, a capturing and processing device for the purpose of implementing the mechanics and methodologies of, for example, FIGS. 4A-4D, 8A and 8B, on an image or video content. In particular embodiments, the depicted camera system may be used to, inter alia, resolve parallax effects in overcapture content (i.e., in which the field of view exceeds 180°) and enable optimized stitching.

The camera system 500 can be used to execute instructions (e.g., program code or software) for causing the camera system 500 (or one or more its components) to perform any one or more of the methodologies and mechanics described herein. Such instructions may be stored on or written into memory (e.g., computer-readable medium) associated with the camera system 500 as a computer program.

In some embodiments, the camera system 500 operates as a standalone device or a connected (e.g., networked) device that connects to other computerized devices (e.g., one or more user devices) or systems. Data communication with other devices may be performed via a wireless or wired interface.

The camera system 500 may include various types of capture devices, for example, a plurality of wide-angle cameras (e.g., fisheye cameras capable of taking overcapture content), an action camera (e.g., a camera capable of capturing, for example, a 360° FOV), a personal computer (PC), a tablet PC, a notebook computer, or other device capable of executing instructions (sequential or otherwise) that specify actions to be taken. In another embodiment, the camera system 500 may include a server. In a networked deployment, the camera system 500 may operate in the capacity of a server or client in a server-client network environment, or as a peer device in a peer-to-peer (or distributed) network environment. Further, while only a single computer system 500 is illustrated, a plurality of camera systems 500 may operate to jointly execute instructions to perform any one or more of the stitching methodologies discussed herein.

The exemplary camera system 500 may include one or more processing units or apparatus. The processor apparatus may include, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of the foregoing. The camera system 500 may include a main memory apparatus. In some variants, the memory apparatus may be part of a storage unit. The processor, memory, and the storage unit may communicate via one or more buses.

Embodiments of a computing system corresponding to a user device (e.g., 512) may include a different configuration than an embodiment of the camera system 500. For example, an embodiment corresponding to the camera system may include a larger storage unit, more memory, more power (e.g., has a power source or larger battery), and/or a faster processor 702. An embodiment corresponding to a user device may include a smaller storage unit, less memory, and a power efficient (and slower) processor, and may include its own capture device (but not as capable or as those of camera system 500).

The storage unit or memory may include a computer-readable medium on which instructions (e.g., a computer program or software) embodying any one or more of the methodologies or functions described herein are stored. The instructions may also reside, completely or at least partially, within the processor apparatus (e.g., within a processor's cache memory) during execution thereof by the camera system 500, the processor also constituting computer-readable media. The instructions may be transmitted or received over a network via the wireless or wired interface.

The term "computer-readable medium" is taken to include a single medium or multiple media (e.g., a centralized or distributed database, or associated caches and servers) able to store the instructions. The term "computer-readable medium" shall also be taken to include any medium that is capable of storing instructions for execution by the camera system 500 and that cause the camera system 500 to perform, for example, one or more of the methodologies or mechanisms disclosed herein.

Where certain elements of these implementations can be partially or fully implemented using known components, only those portions of such known components that are necessary for an understanding of the present disclosure are described, and detailed descriptions of other portions of such known components are omitted so as not to obscure the disclosure.

In the present specification, an implementation showing a singular component should not be considered limiting; rather, the disclosure is intended to encompass other implementations including a plurality of the same component, and vice versa, unless explicitly stated otherwise herein.

Further, the present disclosure encompasses present and future known equivalents to the components referred to herein by way of illustration.

As used herein, the term "bus" is meant generally to denote all types of interconnection or communication architecture that may be used to communicate date between two or more entities. The "bus" could be optical, wireless, infrared or another type of communication medium. The exact topology of the bus could be for example standard "bus", hierarchical bus, network-on-chip, address-eventrepresentation (AER) connection, or other type of communication topology used for accessing, for example, different memories in a system.

As used herein, the term "camera" may be used to refer to any imaging device or sensor configured to capture, record, and/or convey still and/or video imagery, which may be sensitive to visible parts of the electromagnetic spectrum and/or invisible parts of the electromagnetic spectrum (e.g., infrared, ultraviolet), and/or other energy (e.g., pressure waves).

As used herein, the terms "computing device" or "computing system" includes, but is not limited to, personal computers (PCs) and minicomputers, whether desktop, laptop, or otherwise, mainframe computers, workstations, servers, personal digital assistants (PDAs), handheld computers, embedded computers, programmable logic device, personal communicators, tablet computers, portable navigation aids, J2ME equipped devices, cellular telephones, smartphones, personal integrated communication or entertainment devices, or other types of client devices or user devices (mobile or otherwise), or literally any other device capable of executing a set of instructions.

As used herein, the term "computer program" or "software" is meant to include any sequence or human or machine cognizable steps that perform a function. Such program may be rendered in virtually any programming language or environment including, for example, C/C++, C#, Fortran, COBOL, MATLAB™, PASCAL, Python, assembly language, markup languages (e.g., HTML, SGML, XML, VoXML), and the like, as well as object-oriented environments such as the Common Object Request Broker Architecture (CORBA), Java' (including J2ME, Java Beans), Binary Runtime Environment (e.g., BREW), and the like.

As used herein, the term "memory" includes any type of integrated circuit or other storage device adapted for storing digital data including, without limitation, ROM. PROM, EEPROM, DRAM, Mobile DRAM, SDRAM, DDR/2 SDRAM, EDO/FPMS, RLDRAM, SRAM, "flash" memory (e.g., NAND/NOR), memristor memory, and PSRAM.

As used herein, the terms "integrated circuit", "chip", and "IC" are meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), systems on a chip (SoC), application-specific integrated circuits (ASICs), and/or other types of integrated circuits.

As used herein, the term "processing unit" or "processor apparatus" or "processor" is meant generally to include digital processing devices. By way of non-limiting example, digital processing devices may include one or more of digital signal processors (DSPs), reduced instruction set computers (RISC), general-purpose (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die, or distributed across multiple components.

As used herein, the term "network interface" refers to any signal, data, and/or software interface with a component, network, and/or process. By way of non-limiting example, a network interface may include one or more of FireWire (e.g., FW400, FW110, and/or other variation.), USB (e.g., USB2), Ethernet (e.g., 10/100, 10/100/1000 (Gigabit Ethernet), 10-Gig-E, and/or other Ethernet implementations), MoCA, Coaxsys (e.g., TVnet™), radio frequency tuner (e.g., in-band or OOB, cable modem, and/or other protocol), Wi-Fi (802.11), WiMAX (802.16), PAN (e.g., 802.15), cellular (e.g., 3G, LTE/LTE-A/TD-LTE, GSM, and/or other cellular technology), IrDA families, and/or other network interfaces.

As used herein, the term "Wi-Fi" includes one or more of IEEE-Std. 802.11, variants of IEEE-Std. 802.11, standards related to IEEE-Std. 802.11 (e.g., 802.11 a/b/g/n/s/v), and/or other wireless standards.

As used herein, the term "wireless" means any wireless signal, data, communication, and/or other wireless interface. By way of non-limiting example, a wireless interface may include one or more of Wi-Fi, Bluetooth, 3G (3GPP/3GPP2), HSDPA/HSUPA, TDMA, CDMA (e.g., IS-95A, WCDMA, and/or other wireless technology), FHSS, DSSS, GSM, PAN/802.15, WiMAX (802.16), 802.20, narrowband/FDMA, OFDM, PCS/DCS, LTE/LTE-A/TD-LTE, analog cellular, CDPD, satellite systems, millimeter wave or microwave systems, acoustic, infrared (i.e., IrDA), and/or other wireless interfaces.

It will be recognized that while certain aspects of the technology are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the principles of the disclosure. This description is in no way meant to be limiting, but rather should be taken as illustrative of the general principles of the technology. The scope of the disclosure should be determined with reference to the claims.

What is claimed is:
1. A method for optimized stitching of overcapture content, the method comprising:
    capturing the overcapture content;
    producing overlap bands associated with the captured overcapture content;
    downsampling the produced overlap bands to generate downsampled overlap bands with reduced dimensions;
    performing feature detection based on the downsampled overlap bands with reduced dimensions within an integrated memory of a camera device;
    generating a cost map based on the performed feature detection;
    determining shortest path information for the generated cost map; and
    generating a warp file based on the determined shortest path information, the generated warp file being utilized for the optimized stitching of the overcapture content.

2. The method of claim 1, further comprising generating a plurality of fisheye images from the captured overcapture content.

3. The method of claim 2, further comprising projecting the produced overlap bands into an equirectangular projection.

4. The method of claim 2, further comprising transmitting the generated warp file and the generated plurality of fisheye images to another device.

5. The method of claim 2, further comprising stitching the plurality of fisheye images from the captured overcapture content and transmitting the stitched fisheye images and the generated warp file to another device.

6. The method of claim 5, wherein the transmitting of the generated warp file to the another device enables re-stitching of the stitched fisheye images.

7. The method of claim 1, wherein the generating of the warp file comprises generating a plurality of integer values, the generated plurality of integer values being associated with displacement values associated with a stitch line for the captured overcapture content.

8. A camera apparatus comprising:
two or more image capture devices;
a network interface in data communication with the two or more image capture devices; and
an image processing pipeline that is configured to:
receive captured content from the two or more image capture devices;
perform edge detection on the received captured content; and
generate a warp track file comprising a string of unsigned character values representing a path value corresponding to a location of a stitch in a cost map of the captured content,
wherein the warp track file enables an another device to stitch the captured content by performing a look-up in the warp track file.

9. The camera apparatus of claim 8, wherein the generation of the warp track file by the image processing pipeline comprises:
production of overlap bands associated with the received captured content;
downsample of the produced overlap bands to generate downsampled overlap bands with reduced dimensions;
generation of derivative images from the downsampled overlap bands with reduced dimensions;
generation of a cost map associated with the generated derivative images; and
determination of shortest path information for the generated cost map.

10. The camera apparatus of claim 9, wherein the generated warp track file and the captured content from the two or more image capture devices are transmitted via the network interface to another device.

11. The camera apparatus of claim 10, wherein the transmission of the generated warp track file and the transmission of the captured content to the another device enables re-stitching of the captured content.

12. The camera apparatus of claim 10, wherein the generation of the warp track file comprises generation of a plurality of integer values, the plurality of integer values being associated with displacement values associated with a stitch line for the captured content.

13. The camera apparatus of claim 8, wherein the receipt of the captured content comprises receipt of fisheye projections.

14. The camera apparatus of claim 13, wherein the image processing pipeline is further configured to stitch the fisheye projections and the camera apparatus is configured to transmit the stitched fisheye projections and the generated warp file to another device via the network interface.

15. The camera apparatus of claim 14, wherein the transmission of the generated warp track file and the transmission of the stitched fisheye projections to the another device enables a re-stitch of the stitched fisheye projections.

16. A non-transitory computer-readable apparatus comprising a storage medium having a computer program stored thereon, the computer program comprising a plurality of instructions configured to, when executed by a processor apparatus, cause an apparatus to:
receive captured content from two or more image capture devices;
perform edge detection on the received captured content; and
generate a warp file comprising a string of unsigned character values representing a path value corresponding to a location of a stitch in a cost map of the captured content,
wherein the warp file enables an another device to stitch the captured content by performing a look-up in the warp file.

17. The non-transitory computer-readable apparatus of claim 16, wherein the receipt of the captured content comprises receipt of fisheye projections.

18. The non-transitory computer-readable apparatus of claim 17, wherein the plurality of instructions, when executed by the processor apparatus, are further configured to stitch the fisheye projections and transmit the stitched fisheye projections and the generated warp file to another device via a network interface.

19. The non-transitory computer-readable apparatus of claim 18, wherein the transmission of the generated warp file and the transmission of the stitched fisheye projections to the another device enables a re-stitch of the stitched fisheye projections.

20. The non-transitory computer-readable apparatus of claim 16, wherein the generation of the warp file comprises:
production of overlap bands associated with the received captured content;
downsample of the produced overlap bands to generate downsampled overlap bands with reduced dimensions;
generation of derivative images from the downsampled overlap bands with reduced dimensions;
generation of a cost map associated with the generated derivative images; and
determination of shortest path information for the generated cost map.

* * * * *